US 6,747,068 B2

(12) United States Patent
Kelly

(10) Patent No.: US 6,747,068 B2
(45) Date of Patent: Jun. 8, 2004

(54) HYDROPHOBIC POLYURETHANE FOAM

(75) Inventor: David J. Kelly, Chadds Ford, PA (US)

(73) Assignee: Wm. T. Burnett & Co., Jessup, MD (US)

( * ) Notice: Subject to any disclaimer, the term of this patent is extended or adjusted under 35 U.S.C. 154(b) by 0 days.

(21) Appl. No.: 09/783,018

(22) Filed: Feb. 15, 2001

(65) Prior Publication Data

US 2002/0156141 A1 Oct. 24, 2002

(51) Int. Cl.[7] ............................................... C08G 18/10
(52) U.S. Cl. ..................... 521/99; 521/112; 521/116; 521/134; 521/137; 521/170; 521/174
(58) Field of Search ........................... 521/99, 112, 116, 521/134, 137, 170, 174

(56) References Cited

U.S. PATENT DOCUMENTS

| | | |
|---|---|---|
| 3,748,288 A | 7/1973 | Winkler et al. |
| 3,884,848 A | 5/1975 | Ricciardi et al. |
| 4,237,237 A | 12/1980 | Jarre et al. |
| 4,264,743 A | 4/1981 | Maruyama et al. |
| 4,347,330 A * | 8/1982 | Demou et al. .............. 521/110 |
| 4,670,477 A | 6/1987 | Kelly et al. |
| 5,552,449 A | 9/1996 | Sollers et al. |

OTHER PUBLICATIONS

"Urethane Foam—Seals", General Motors Engineering Standards. Aug. 1995, General Motors Corporation.
"Polyurethane Foam, Sound Deadening—Die Cut", Ford Engineering Material Specification, Jun. 1977.
Specification for SupersealW Sep. 27, 1991.
Specification for ECP 160–50 EO–Charcoal (Isoseal) Nov. 2, 2000.

* cited by examiner

Primary Examiner—John M. Cooney, Jr.
(74) Attorney, Agent, or Firm—Venable LLP; Michael A. Gollin; Keith G. Haddaway

(57) ABSTRACT

The invention is a hydrophobic polyurethane foam prepared from a conventional PO/EO polyether polyol, a graft polyol and a hydrophobicity inducing surfactant. The foam is sufficiently hydrophobic to pass a stringent water impermeability test.

65 Claims, 4 Drawing Sheets

HYDROPHOBIC POLYURETHANE FOAM

BACKGROUND OF THE INVENTION

1. Field of the Invention

This invention relates to hydrophobic polyurethane foams. Specifically, the invention relates to a hydrophobic foam prepared from a polyether polyol.

2. Background

Polyurethane foams and their methods of manufacture are well known. These foams have a large number of applications including: cushioning for furniture and bedding, including mattresses and topper pads; padding for underlying carpets; seals and gaskets for a variety of uses; acoustical applications; textile laminates; and energy absorbing materials. In particular, hydrophobic polyurethane foams provide a material useful for resisting water penetration in applications such as gaskets and seals. Several approaches have been attempted to produce hydrophobic polyurethane foams.

One method of rendering a polyurethane foam hydrophobic is by impregnating the foam with a hydrophobic agent such as asphalt. Typically, when preparing foams according to this method, the hydrophobic agent in a volatile solvent is added to the prepared foam and the solvent is allowed to evaporate. This method suffers from the drawback of using large amounts of volatile solvents which, when evaporated, may present environmental hazards. In addition, the volatile solvent may affect the physical properties and feel of the foam. In a variation of this technique, an aqueous dispersion of the hydrophobic substance is used to impregnate the foam. However, formation of an aqueous dispersion requires the use of an emulsifier prior to addition to the foam. This method suffers problems because the emulsifier remains in the foam after treatment. The emulsifier in the foam may adversely affect the physical properties or feel of the foam causing problems similar to those experienced when using a volatile solvent.

Alternatively, hydrophobic constituents such as asphalt derivatives may be incorporated into the foam structure during manufacture. For example, the hydrophobic substance may be incorporated by being present during foam formation or during the molding process. Again, however, these methods produce foams with altered physical properties that may not be suitable for particular applications.

Another approach, described in U.S. Pat. No. 4,264,743 to Maruyama et al., assigned to NHK Spring Co., Ltd. of Japan, utilizes a polyester polyol based on dimer acid or castor oil as the major polyol component and other additives such as a blowing agents, a foam stabilizer, a catalyst and, optionally, a lipophilic filler. Such foams are marketed under the name Super Seal® by, for example, Recticel in Europe and Foamex in the United States. These polyester polyol based polyurethane foams exhibit good hydrophobicity, but suffer from hydrolytic instability due to the nature of the polyester material. In addition, these foams frequently have relatively high densities, for example, over 3 pounds for cubic foot. Thus, the cost of these foams per unit volume tends to be high.

Propylene oxide and propylene oxide/ethylene oxide polyether polyol (hereinafter "PO/EO polyether polyol") blends are used to manufacture polyether polyols for making polyether polyurethane foams. These foams are typically characterized by good cushioning properties and excellent hydrolytic stability. Furthermore, the polyether polyols based on a PO/EO blend will have better processing characteristics that translate into higher yields and better quality foams. It would thus be desirable, in terms of hydrolytic stability and high quality foams, to produce hydrophobic polyurethane foams for, among other applications, use in seals and gaskets based on PO/EO polyether polyols. Attempts to produce highly hydrophobic foams from this system in the past have been unsuccessful.

The present invention overcomes the drawbacks in the art described above. The foam of the present invention has both good hydrophobic properties and good hydrolytic resistance; its relatively low density translates into a low cost polyurethane foam.

SUMMARY OF THE INVENTION

The invention relates to a hydrophobic polyurethane foam prepared from a PO/EO polyether polyol, a graft polyol and a hydrophobicity inducing surfactant. The present invention is also a hydrophobic polyurethane foam prepared from a PO/EO polyether polyol and a graft polyol, the foam being sufficiently hydrophobic to pass stringent water impermeability tests, for example, tests used by GM and Ford in the automotive industry and described in detail below (hereafter sometimes collectively referred to as the "automotive type tests"). Preferred foams are sufficiently hydrophobic to pass a water impermeability test for at least 60 minutes, more preferred foams for at least 90 minutes, and the most preferred foams are sufficiently hydrophobic to pass a stringent water impermeability test for at least 24 hours. Graft polyols useful in preparing the inventive foams typically comprise polystyrene and/or polyacrylonitrile grafted onto or dispersed into a PO/EO polyether backbone structure. In a preferred foam, the graft polymer comprises about 60% of a PO/EO polyether backbone, about 30% polystyrene and about 10% polyacrylonitrile. A preferred foam is formed from about 80 parts graft polyol and about 20 parts PO/EO polyether polyol.

The foams of the invention are also prepared using a surfactant, particularly a hydrophobicity inducing surfactant. Typically, hydrophobicity inducing surfactants are polysiloxane-polyalkylene oxide copolymers, usually the non-hydrolyzable polysiloxane-polyalkylene oxide copolymer type. Hydrophobicity inducing surfactants include: Goldschmidt Chemical Corp. of Hopewell, Va. products sold as B8110, B8229, B8232, B8240, B8870, B8418, B8462; Organo Silicons of Greenwich, Conn. products sold as L6164, L600 and L626; and Air Products and Chemicals, Inc. products sold as DC5604 and DC5598. Preferred surfactants are B8870, B8110, B8240, B8418, B8462, L626, L6164, DC5604 and DC5598. B8870 and B8418 from Goldschmidt Chemical Corp. are more preferred; B8418 is most preferred. Polyisocyanates are preferably added at a polyisocyanate index of from about 75 to about 125. Toluene diisocyanate is a preferred polyisocyanate, preferably at a TDI index of about 100. Typically, the inventive foams have an air flow of from about 0.01 to about 3.0 ft$^3$/ft$^2$/min and a density of no more that about 4.0 lb/ft$^3$. The inventive foams may also contain typical polyurethane foam additives such as, for example, catalyst, dye, blowing agent and fire retardant.

In another aspect, the hydrophobic polyurethane foams of the invention are made up of polyol segments derived from a graft polyol and polyol segments derived from a PO/EO polyether polyol and prepared using a hydrophobicity inducing surfactant.

In another aspect, the invention is a hydrophobic polyurethane foam produced by the process of combining a polyisocyanate with a PO/EO polyether polyol and a graft polyol, and allowing the polyisocyanate and polyols to react in the presence of a surfactant to form a foam that is sufficiently hydrophobic to pass a stringent water impermeability test, preferably for at least 60 minutes, more preferably for at least 90 minutes and most preferably for at least 24 hours, with substantially no leaks of water through or into the foam.

In yet another aspect, the foams of the present invention may be formed into a manufactured article, for example, cushioning, padding, a seal such as an automotive seal and a gasket such as an automotive gasket.

Further objectives and advantages would become apparent from consideration of the description and examples that follow.

DETAILED DESCRIPTION OF THE INVENTION

Figure 1:
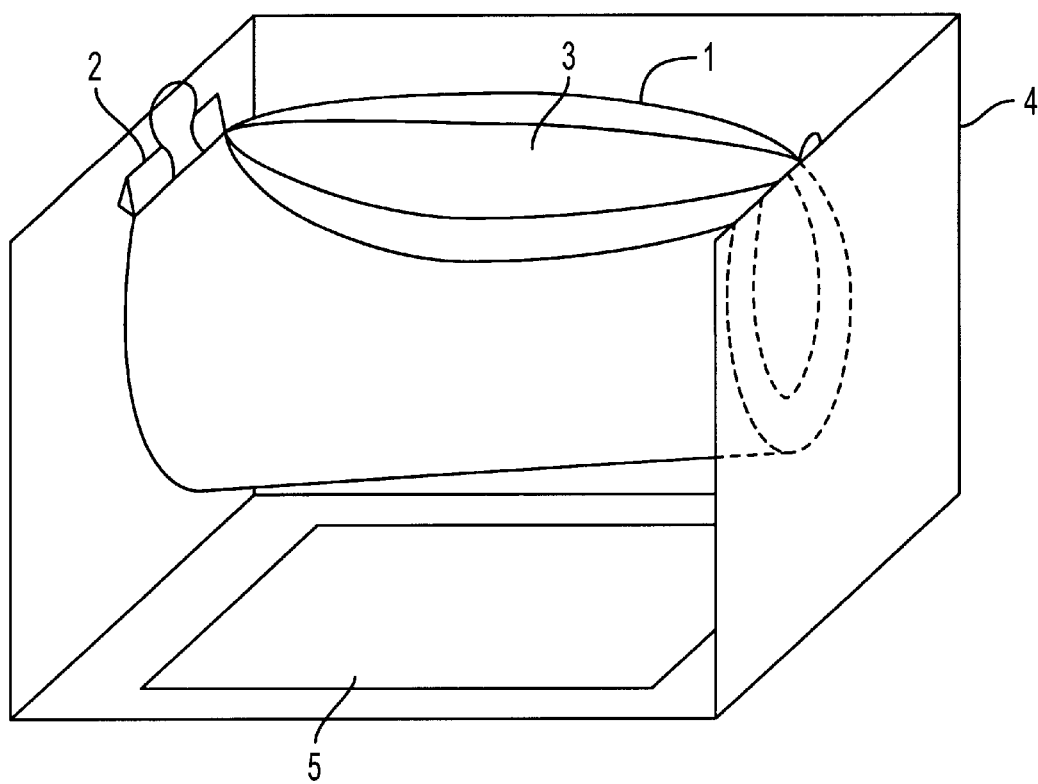
FIG. 1 is a diagram showing the folding of foam for the 0% compression test.

In describing preferred embodiments of the present invention, specific terminology is employed for the sake of clarity. However, the invention is not intended to be limited to the specific terminology so selected. All references cited in this application are incorporated by reference in their entirety as if each reference had individually been indicated to be incorporated by reference. "Graft polyols" are described in U.S. Pat. No. 4,670,477 as "Modified polyether polyols" that are typically poly(ethylene oxide/propylene oxide) ether polyols into which is dispersed one or more of polystyrene, polyacrylonitrile, or polyurea. Although these are the most common commercially available graft polyols, other graft polyols may be used. Graft polyols are commercially available from several companies, including Bayer (supplied as "Polymer Polyol"), BASF (supplied as "Graft Polyol"), and Dow (supplied as "Co-polymer Polyol"). Bayer Polymer Polyol, BASF, and Dow use the polystyrene polyacrylonitrile system. Bayer PHD polyols are based on a polyurea dispersed system. Some examples of commercially available graft polyols include:

| MANUFACTURER | COMMERCIAL DESIGNATION |
|---|---|
| BASF ("Graft Polyols") | P994LV |
|  | P1442 |
|  | P1443 |
| Dow ("Copolymer Polyols") | 3943 |
| Bayer Corp. ("PHD Polyols") | E9232 |
| Bayer Corp. ("Polymer Polyols") | HS100 |

Presently available graft polyols are examples of graft polyols that may be used in the present invention. However, the invention is not limited to polystyrene/polyacrylonitrile, or polyurea based graft polyols.

"PO/EO polyether polyol," "conventional PO/EO polyol" and "conventional polyether polyol" refer to a copolymer incorporating only ethylene oxide and propylene oxide subunits. Such copolymers may be block copolymers, wherein an oligomer of ethylene oxide is attached to an oligomer of propylene oxide; random copolymers, where ethylene oxide subunits and propylene oxide subunits are dispersed randomly; or polymers that are a combination of block polymers and random polymers.

The present invention succeeds where previous efforts have failed by producing a polyurethane foam that is hydrophobic while possessing the good hydrolytic stability of a polyether foam. In addition, the present invention succeeds in producing extremely hydrophobic polyurethane foam which has heretofore been achievable only by using a special polyester polyol system and other additives.

This invention solves a problem previously thought to be unsolvable by providing polyurethane foams with enhanced hydrophobicity containing conventional polyether polyol and graft polyol as the polyol components. The invention is contrary to the teaching of the prior art which has failed to produce a highly hydrophobic polyurethane foam based on PO/EO polyether polyols.

In addition to the above advantages, the present invention provides hydrolytically stable, hydrophobic polyurethane foams with low density. The low density results in an economic advantage over prior art highly hydrophobic foams.

Polyurethane foams are typically produced from at least one polyol, at least one polyisocyanate and at least one surfactant. The polyol component may be any compound that terminates in hydroxy (—OH) groups and can react with the isocyanate groups of the polyisocyanate. Suitable polyols include, for example, polyethers and polyesters.

The present invention provides hydrophobic polyurethane foams prepared from polyether polyols based on PO/EO polyether polyols rather than using major amounts of polyester polyols or propylene oxide homopolymer polyols. More specifically, the present invention utilizes, as the polyol component, a mixture of a conventional PO/EO polyether polyol and a graft polyol. The preferred graft polyol is a graft polymer of a PO/EO polyether backbone with grafted and/or dispersed polystyrene and polyacrylonitrile. The graft polyol typically comprises about 60% PO/EO polyether polyol, about 30% polystyrene and about 10% polyacrylonitrile. Such graft polyols are well known in the art. Suitable graft polyols are widely available and include, for example, P1442, P1443 and P1489 from BASF and HS100 from Bayer Corp.

A preferred graft polyol is Pluracol Polyol 1442 (P1442) from BASF. BASF describes P1442 as:

a secondary hydroxyl-terminated graft polyether triol containing approximately 43% solids of copolymerized styrene and acrylonitrile. This polyol has been formulated with a low volatile inhibitor package designed for either conventional curing or mechanical forced-air curing. This high solids graft polyol can be used to manufacture flexible slabstock foam having maximum load-bearing properties. It can be used alone for maximum effect or in combination with conventional polyols.

Conventional PO/EO polyether polyols may be of variable composition. However, commercially available PO/EO polyether polyols typically have an ethylene oxide content of from about 8% to about 12%. Conventional PO/EO polyether polyols are well known in the art and are available from a wide variety of sources. Suitable conventional PO/EO polyether polyols include, for example, M7059 and 3222 from Bayer Corp. and 1388 from BASF.

The ratio of conventional polyol to graft polyol useful in the present invention is variable and can range from about 100% graft polyol to about 80 parts conventional polyol and 20 parts graft polyol. A ratio of 20 parts conventional polyol to 80 parts graft polyol is particularly preferred.

Polyurethane foams and polyurethane foam manufacturing is a well known art. In addition to the polyisocyanate, surfactant and polyol, manufacturing requires a catalyst, typically comprising a tertiary amine component and an organo-tin component, and a blowing agent. Additional components such as dyes and fire retardants are also frequently added. Different combinations of polyol, polyisocyanate and surfactant tend to give different properties to the resultant polyurethane foam. Polyurethane foams vary from being flexible to semi-rigid to rigid, having open cell structures to relatively closed cell structures, porous to non-porous, and may have a wide range of other physical properties.

In principle, a wide range of polyisocyanates may be used to prepare polyurethane foams of the invention such as, for example, toluene diisocyanate (TDI), polymethylenepolyphenylene polyisocyanate (MDI), hexamethylene diisocyanate (HMDI), 1,5-naphthylene diisocyanate, xylylene diisocyanate, hydrogenated polymethylenepolyphenylene polyisocyanate, and mixtures thereof. Toluene diisocyanate is preferred.

When toluene diisocyanate is used as the polyisocyanate, it is typically added at a TDI index (i.e., the ratio of TDI actually used to the theoretical stoichiometric amount of TDI) of from about 75 to about 125. A TDI index of about 100 is preferred. When a polyisocyanate other than TDI is employed for manufacturing a hydrophobic polyurethane foam according to the invention, the polyisocyanate index is adjusted similarly. Adjustment of the polyisocyanate index is well known in the art of polyurethane foam manufacturing. Optimization of polyisocyanate index for specific polyisocyanates other than TDI is contemplated and within the scope of the present invention, and may be achieved utilizing routine experimentation by methods well known to those skilled in the art.

The function and use of surfactants in polyurethane foams is well known in the art and has been described. See, for example, Herrington, Nafziger, Hock and Moore in *Flexible Urethane Foams*, pp. 2.22–2.25. Surfactants employed in the preparation of polyurethane foams are generally polysiloxanes/polyalkylene oxide copolymers, and are available from several manufacturers including, for example, Goldschmidt Chemical Corp., OSi, and Air Products and Chemicals, Inc. Almost all polyurethane foams are made with the aid of nonionic silicone-based surfactants.

Surfactants help to control the precise timing and the degree of cell-opening. Within each foam formulation a minimum level of surfactant is needed to produce commercially acceptable foam. In the absence of a surfactant, a foaming system will normally experience catastrophic coalescence and exhibit an event known as boiling. With the addition of a small amount of surfactant, stable yet imperfect foams can be produced; and, with increasing surfactant concentration, a foam system will show improved stability and cell-size control. At optimum concentrations, stable open-cell foams are produced. However, at higher surfactant levels the cell-windows become overstabilized and the resulting foams are tighter and have less desirable physical properties. Surfactants that may be used to produce foams with a particular polyisocyanate/polyol composition are referred to as foam-stabilizing surfactants.

Surfactants are typically polysiloxane-polyalkylene oxide copolymers. The polyoxyalkylene (or polyol) end of the surfactant is responsible for the emulsification effect. The silicone end of the molecule lowers the bulk surface tension. When a hydrolyzable surfactant, which contains Si—O linkages between the silicon and polyether groups, is contacted with water (as in a foam masterbatch or a silicone/amine/water stream) the molecule breaks apart to form siloxane and glycol molecules. When this occurs, the individual molecules no longer exhibit the proper surfactant effects. Non-hydrolyzable type surfactants, which contain a water stable Si—C bond between the silicon and polyether chain, are thus preferred.

Commercial foams are generally manufactured using "forgiving" surfactants that function over a range of concentrations for a given polyisocyanate/polyol combination, although there will be an optimal concentration. These surfactants are useful because foams produced from them are not affected by minor fluctuations in the manufacturing process such as variations in metering caused by machine differences. Thus, in the manufacture of a conventional foam, once a suitable "forgiving" catalyst and concentration are identified, there is no motivation to vary the identity or concentration of the catalyst.

All foam stabilizing surfactants which result in a hydrophobic polyurethane foam are referred to herein as "hydrophobicity inducing surfactants." For the purposes of the present invention, suitable surfactants are foam stabilizing surfactants that produce a hydrophobic foam when the graft polyol and conventional polyol react with the polyisocyanate in the presence of the surfactant. For a given composition, there may be several suitable hydrophobicity inducing surfactants and other surfactants may not be suitable. The hydrophobicity inducing surfactants are generally not "forgiving" in the manufacture of conventional foams and for foams based on graft polyols, such as the foams of the present invention. Furthermore, surfactants useful for the purposes of the present invention include surfactants that are not typically recommended for conventional flexible foams, including high graft polyol foams of the present invention. Surfactants already identified as hydrohobicity inducing surfactants suitable for the invention include: B8110, B8229, B8232, B8240, B8870, B8418, and B8462 from Goldschmidt Chemical Corp.; L626, L600 and L6164 from OSi; and DC5604 and DC5598 from Air Products and Chemicals, Inc. (Table 3). Preferred surfactants result in foams capable of resisting the penetration of water for more than 24 hours, for example, B8870, B8110, B8240, B8418, B8462, L626, L6164, DC5604 and DC5598.

Hydrophobicity inducing surfactants include a broad range of surfactants that may be recommended for use in forming flexible foam, in forming semi-rigid foam and in forming rigid foam. The surfactants identified above represent a cross section of commercially available surfactants with differing manufacturers' recommendations for use. Once a suitable composition has been identified in accordance with the present invention, other hydrophobicity inducing surfactants may be identified by preparing sample batches of foam followed by hydrophobicity testing. Such optimization is within the knowledge of a person skilled in the art of foam manufacturing.

Tertiary amines and organo-tin compounds are preferably used as catalysts. The particular tertiary amine and organo-tin catalyst used in obtaining the hydrophobic polyurethane foams of the present invention is not critical, and any combination of components readily known to those skilled in the art may be used. Examples of suitable tertiary amines include triethylenediamine, triethylamine, N-methyhnorpholine, N-ethylmorpholine and N,N,N'N'- tetramethylbutanediamine. Suitable organo-tin catalysts include stannous octoate and dibutyltin dilaurate.

Examples of blowing agents used in the present invention include water, low boiling alkanes such as butane and pentane, acetone and liquid carbon dioxide.

Additional components that may be used in the present hydrophobic polyurethane foams include, for example, crosslinking agents; fillers, such as carbon black and calcium carbonate; UV-absorbers; and antioxidants.

Flame retardants may also be added to render the foamed product flame retardant. Suitable flame retardants include tris(chloroethyl) phosphate, tris(2-chloroethyl) phosphate, tris(dichloropropyl) phosphate, chlorinated paraffins, tris (chloropropyl) phosphate, phosphorus-containing polyols, and brominated aromatic compounds such as pentabromodiphenyl oxide and other brominated polyols.

As is known in the art, the rigidity of polyurethane foams may be adjusted by varying the ratio of graft polyol to PO/EO polyether polyol in the polyurethane composition. For example, a composition comprising 80% graft polyol to 20% conventional PO/EO polyether polyol generally gives a stiffer foam whereas composition comprising 20% graft polyol and 80% conventional polyol generally give rise to a softer foam. In general, however, hydrophobicity of a polyurethane foam is not related to its firmness. Thus, hydrophobic foams, like conventional foams, may vary broadly in firmness. (See Table 4, described below)

According to the present invention, a hydrophobic polyurethane foam may be produced from a polyisocyanate, and a mixture of two or more polyols. The polyols comprise (1) a conventional PO/EO polyether polyol and (2) a graft polyol. Thus, the resultant hydrophobic polyurethane comprises segments derived from the conventional PO/EO polyether polyol and segments derived from the graft polyol. In addition to the polyisocyanate and polyols, the foam is produced in the presence of a hydrophobicity inducing surfactant. The inventive foam is sufficiently hydrophobic to pass a stringent water impermeability test, such as an automotive water impermeability test, for at least 60 minutes, more preferably 90 minutes and most preferably for 24 hours, with no leakage of water through or into the foam. After foam formation, any residual surfactant not incorporated into the foam structure may be removed, if desired, for example, by rinsing. Preferred foams have an air flow of from about 0.01 $ft^3/ft^2/min$ to about 5.0 $ft^3/ft^2/min$. In addition, the density of preferred foams can range from about 1.20 $lb/ft^3$ to about 4.0 $lb/ft^3$.

As used herein, "hydrophobic polyurethane foam" refers to a polyurethane foam material that is water impermeable in that it resists the flow of water into or through the foam, when a water column of up to one inch height exerts pressure on the foam for at least 60 minutes, preferably for at least 90 minutes, and most preferably for at least 24 hours. The hydrophobic foams of the invention pass a stringent water impermeability test, exhibiting hydrophobic behavior whether compressed or uncompressed.

Virtually all polyurethane foams are water resistant in the sense that, when a drop or other small amount of water is placed on the surface of the foam, the water tends to "bead up" rather than soak into the foam or travel through the foam. However, when a column of water or water under pressure is placed on a conventional polyurethane foam, the foam begins to soak up the water e.g. through wicking and/or absorption. This phenomenon is analogous to that exhibited by cellulose sponges which do not effectively absorb water when dry, but exhibit improved water absorption after being saturated with water and then being squeezed to remove excess water. The non-hydrophobic behavior of conventional typical polyurethane foams is exhibited when the foam is in a non-compressed as well as in a compressed state. Once sufficient absorption of water has occurred to locally saturate the foam, water will soon travel freely through the foam at the site of saturation.

In contrast, as noted above, hydrophobic foams of the present invention pass a "stringent water impermeability test." That is, they resist penetration of water for a period in excess of about 60 minutes, preferably in excess of about 90 minutes and more preferably in excess of about 24 hours, when a column of water, for example up to a one inch column of water, is applied to the foam. Foams according to the invention pass such a test whether compressed or not.

There are several water impermeability tests that can be employed, and hydrophobicity may be assessed in a non-compressed state or in one or more compressed states. A test for water impermeability in a non-compressed state is described in the examples which follow. Water impermeability tests used in the automotive industry, e.g. the Ford and GM tests, are representative water impermeability tests for testing the hydrophobicity of foams in the compressed state. Examples of water impermeability tests used to evaluate the foams of the present invention, including Ford and GM tests, are described in the examples below. When subject to the Ford and GM tests, the hydrophobic foams of the present invention are capable of resisting water penetration for at least about 60 minutes, preferably for at least about 90 minutes and most preferably for at least about 24 hours. Preferred foams easily surpass the 90 minute test period used as a standard in the automotive tests. Other stringent water impermeability tests, as well as other tests for hydrophobicity correlated to the above may, of course, be used and are contemplated by the invention.

In a preferred embodiment of the invention, a polyurethane foam is prepared from a polyisocyanate, for example toluene diisocyanate, a mixture of 20% conventional polyol, for example, M7059 from Bayer, and 80% graft polyol, for example, P1442 from BASF. This mixture of polyols is combined with a mixture of tertiary amine catalyst, tin catalyst and other desired components such as dye and fire retardant. The TDI index is adjusted to about 100. To this is added about one part (based on 100 parts of polyol) of a hydrophobicity inducing surfactant, for example B8870 from Goldschmidt, and a foam is allowed to form.

Hydrophobic polyurethane foams according to the invention contain a combination of graft polyol and conventional polyol. Hydrophobic polyurethane foams with otherwise commercially acceptance properties have been prepared using ratios of graft polyol to conventional polyol in the range of about 80:20 to 20:80. Hydrophobic polyurethane foams according to the invention may be prepared using even a lower ratio, including 0% graft polyol, or higher ratios including 100% graft polyol. However, foams prepared near the extremes of graft polyol concentration, i.e., near 0% and 100% graft polyol, may require further optimization of catalyst, water and surfactant content using techniques apparent from this description and within the knowledge of persons skilled in the art. The non-limiting examples set forth below reflect bench scale preparation of the inventive foams. The foams have also been prepared in full scale continuous production with identical results.

Polyurethane foams according to the invention may be used in a wide variety of applications, including for use as gaskets and seats in the automotive industry to seal against air, dust and/or water. In addition, these foams may be used as sound deadening in automobiles, as a general use flexible materials for covering gaps and openings as well as for non-sealing applications.

The invention is better understood when the disclosure is viewed in light of the following non-limiting examples.

EXAMPLES

Examples 1–56

The compositions of Examples 1–46 were prepared in a pilot lab as hand mix samples as follows:

The polyol or resin, activators and catalysts, along with any flame retardants, surfactants, dyes, etc., were weighed on a balance in a small tri-pour beaker. These were mixed with a spatula by hand until blended. The TDI was weighed and added to the mixture and mixed in with a drill and mixing bit.

The mixture was poured into a cardboard sample box and a mold put around the box. The foam was allowed to rise to full height until completion of foaming process. The sample was then placed in an oven to speed cure and to "set" the foam.

This sample was cut into pieces for various tests including: sample density, airflow, CFD and water impermeability tests.

Example 57

Density

A standard-sized sample was carefully measured and accurately weighed. The density, reported in pounds per cubic foot, was determined as the sample weight divided by its volume.

Example 58

Air Flow

Air flow is a measurement of the openness or porosity of a foam. Air was pulled through a standard thickness sample and the flow rate observed. Air flow values are sensitive to the orientation of the sample in the foam. The values reported herein are air flow parallel to foam rise.

Example 59

Compression Force Deflection (CFD)

The CFD test measures the force required to compress the foam to a specified level. The CFD test uses a plate large enough to apply force across the entire top surface of a 4"×4"×1" foam sample.

The sample was placed on a support plate which has been perforated to allow airflow. A compression foot is placed on the foam. The sample was conditioned by compressing it twice to 75% of its original thickness. After the sample relaxed for 10 minutes, force was applied to the compression foot so that the sample was compressed at a constant rate. When the sample was compressed to 25%, 50% and 75% of its original height, this thickness is held for 60 seconds, and the final load recorded. The test was repeated for three samples and the mean reported.

Example 60

Water Impermeability Test for Non-compressed Foam

A 1-inch thick sheet of foam 1 is folded in half and and the ends held together with clips 2 attached on the ends as shown in FIG. 1. The clipped ends of the foam are drawn together to form an opening 3 so that the foam forms a shallow cup for the addition of water. The folded piece of foam is placed in a cardboard box 4 with the front flap cut out for viewing and a piece of paper 5 below the foam to aid in the detection of water leaking through the foam. One inch of water is placed into the center of the foam through the opening 3 and the start time noted. The time is measured until the foam is saturated and water begins to drip through the foam and onto the paper 5.

Because there is no compression of the foam in performing this test, water must be added carefully to the foam to avoid added pressure which will cause wicking in the foam and a more rapid saturation. For conventional foams, it was found that the non-compression test results first in a saturation of the foam, after which the water begins leaking through the foam in the area of saturation. For the hydrophobic foams of the invention, there may be some localized penetration of water into the uncompressed foam; however, no flow of water through the foam is observed at time periods of at least 60 minutes and frequently for at least 90 minutes. No flow of water was observed through the most preferred foams at time periods of 24 hours or more.

Example 61

Automotive Water Impermeability Test

Two automotive water impermeability tests, the Ford test and the GM test, were conducted in accordance with the respective protocol, outlined below:

A. The Ford Test

The Ford Test corresponds to Ford Laboratory Test Method BO 112-03 entitled "Test to Verify Water Impermeability of Urethane Foam Seals," which is incorporated herein by reference and summarized below:

Material

Furniture paste wax or equivalent

Alcohol (methanol or ethanol) reagent grade 2 clear acrylic sheets. 250×280×6 mm 2 plywood sheets—150×150×12.5 mm having slots to allow for the thickness of the acrylic sheets and to compress a seal 50–75%.

Figure 2:
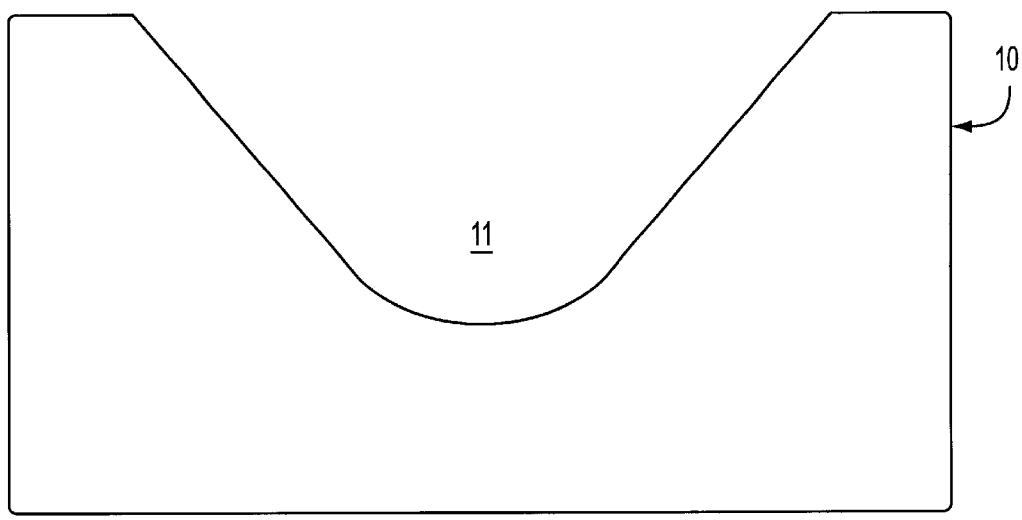
FIG. 2 is a diagram of the specimen die for the Ford Water Impermeability test for hydrophobicity.

Specimen die as per FIG. 2.

Procedure

The material is conditioned in a controlled atmosphere of 23 (±2) ° C. and 50 (±5) % relative humidity for not less than 24 hours prior to testing and tested under the same conditions unless otherwise specified.

An sample of the foam is chosen which lends itself to entrapment of water (e.g., minimum diameter), or specimens cut with die. FIG. 2 is a diagram at the specimen die 10 defining a foam shape for the Ford test. The outside dimensions of the sample are about 4 in height by about 6 inches in width. The inner cavity 11 is about 2½ inches deep.

The clear acrylic panels are cleaned with alcohol and then waxed with furniture paste wax to remove surface contamination. After coating the clear plastic sheets and allowing them to dry a few minutes, the sheets are buffed briefly to form a smooth even coating. The sheets are then placed against both parallel surfaces of the polyurethane seal being tested.

The clear acrylic panel is clamped using the slots in the plywood squares to compress the seal over the area being tested. The seal must be evenly compressed to 50 to 75 percent of the free state height. Care is taken not to touch or recontaminate the clear acrylic plastic surface during the process of applying it to the seal.

The void between the clear plastic sheets above the seal inside diameter or radius of the die cut specimen is filled with 0.25 kPa or a 25 mm head of water.

After 90 minutes, the sample is examined for wicking or water penetration. This can be observed by actual formation of water droplets below the seal and will result in a drop in the water level.

The water is poured out of the void and the plywood squares and acrylic plastic sheets removed from the foam seal. The seal is hand squeezed to determine if it has soaked up any water.

The part fails the test if there is any water penetration of the seal material being tested (e.g., water droplets below the seal or soaked into the seal).

B. The GM Test

The GM test corresponds to General Motors Engineering Standard GM6086M entitled "Flexible Expanded Rubber Materials", which is incorporated herein by reference and summarized below. The GM test for Uretahne foam seals requires that the foam must hold, at 50% compression, a 25 mm head of water for 90 minutes with no leaks through the material. Preferred materials are able to hold a 25 mm head of water for at least 24 hours.

Figure 3:
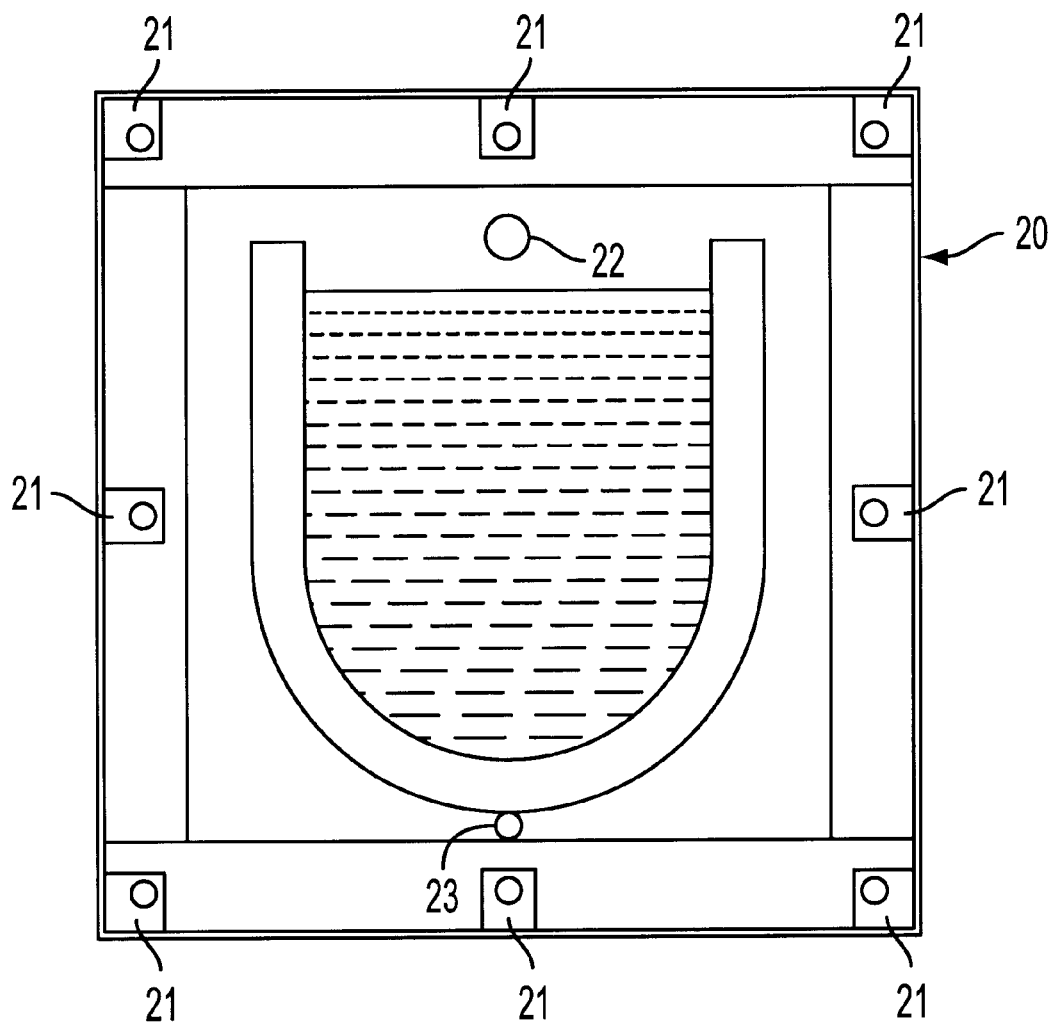
FIG. 3 is a diagram of the water sealing test fixture for use in the GM Water Impermeability test for hydrophobicity.

FIG. 3 shows the water sealing fixture 20. Two ½" thick×8"×8" clear plastic plates 20, spacers of various thickness, 6.35×38 mm bolts with washers are required. Eight 7 mm diameter holes 21 are evenly spaced around the perimeter of the plastic plates 20. A ½" diameter hole 22 is drilled near the top of one plate to allow water to be poured into the fixture. A ⅛" diameter hole 23 is drilled near the bottom of the same plate to allow even pressure and permit drainage between test cycles. Noncorrosive metal or plastic spacers may be used to control compression.

Figure 4:
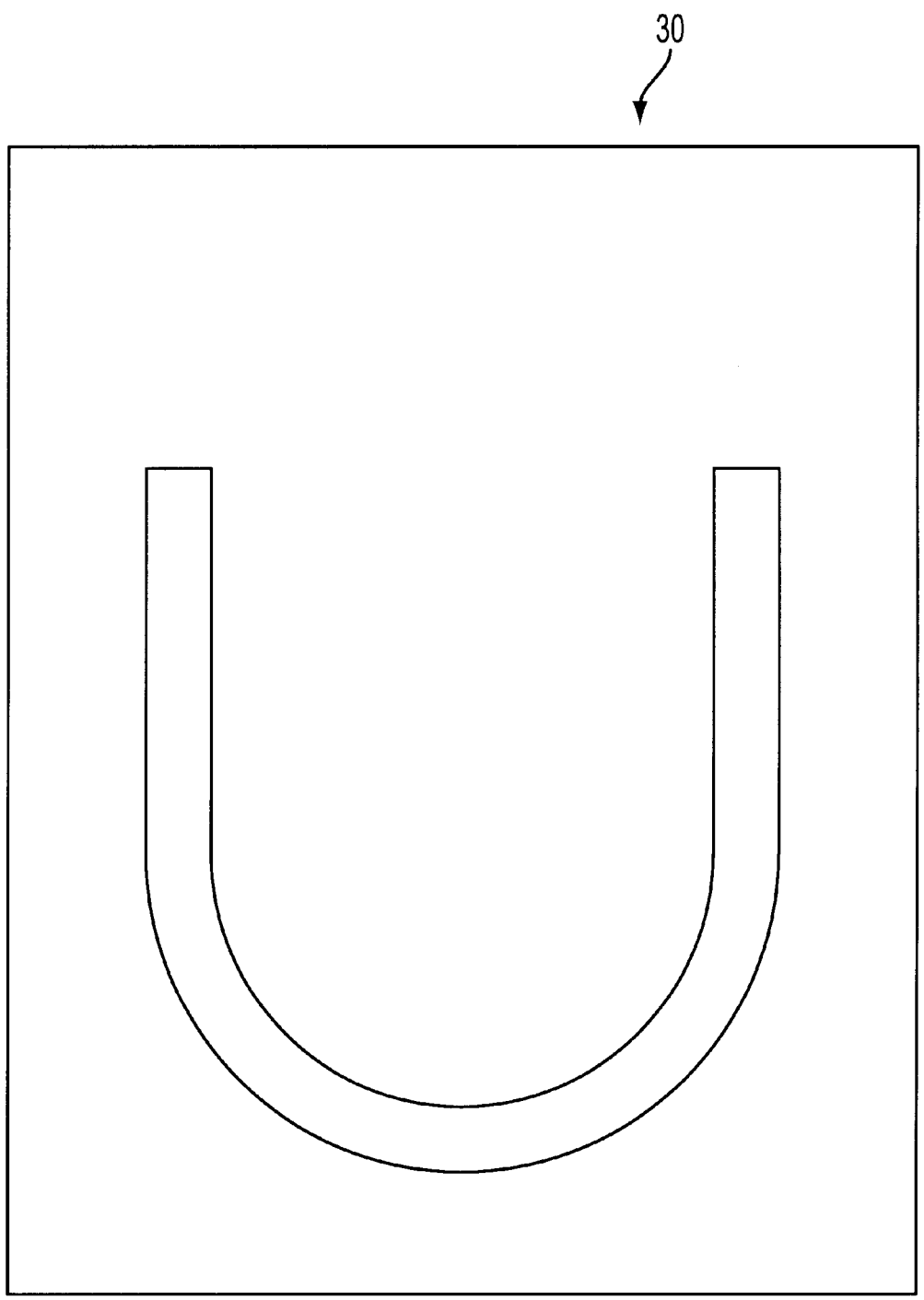
FIG. 4 is a diagram of the specimen die for the GM test.

Sample Preparation. FIG. 4 shows the die 30 for preparing a sample in the GM test. A "U" shaped foam sample gasket 12.5 mm in width, 127 mm wide at open outside ends of "U" and 140 mm deep with an inside radius R of about 2" is cut with the die 30. The material is sandwiched between the plates and the spacers are placed along the sides of the fixture. The fasteners all around the fixture are tightened to the pattern shown defined by the holes 21.

The samples are conditioned for 24 hours at 23 (±2)° C. in the fixture prior to addition of water. The test fixture is filled with water up to the fill hole 22. The material must provide a complete water seal for a minimum of 1 hour when compressed 30%. Lower compressive levels may be specified for particular applications, but leak free time must be the same.

If the material passes the above test, it is thermal cycled in the fixture for 7 days without water in the fixture in an air-circulating test chamber capable of programming temperature cycles from −40 to 200° C. One cycle consists of 8 h at 121° C., 20 minute ramp (7.5° C./minute) to −29° C., 8 h at −29° C. followed by 20 minute ramp to 121° C. At the end of the 7 day test, the fixture is cooled to room temperature and water added up to the fill hole 22. The material must provide a complete water seal for a minimum of 1 hour.

Discussion

Table 1 below shows the composition of several sample polyurethane foams prepared according to the present invention (Examples 2, 3, 4, 7, 8, 9, 10, 11, 14, 15) and comparative examples (Examples 1C, 5C, 6C, 9C, 12C, 13C, 16C, 17C). The table also shows the density, air flow and automotive water impermeability test results of these foams.

In the absence of a hydrophobicity inducing surfactant, a foam having about 80 parts graft polyol and 20 parts conventional polyol exhibits very low hydrophobicity (Examples 1C and 5C). In contrast, incorporation of a hydrophobicity inducing surfactant results in a foam (Example 4) having a density of about 1.73 lb/ft$^3$ measured immediately after manufacturing. The air flow of this foam, which is a measurement of the openness of the foam, was found to be about 0.04 ft$^3$/ft$^2$/min. Most surprisingly, this formulation was found to have GM water impermeability test results showing no water permeability at times in excess of three hours. In fact, one sample retained 100% of the water in the GM water impermeability test for six days, which is unprecedented for a polyether polyol foam. The industry standard is 90 minutes, but times of greater than 24 hours are particularly advantageous. Currently available polyether based hydrophobic polyurethane foams may show penetration times that exceed 90 minutes, but rarely show times that exceed several hours.

The foams of Table 1 were prepared from 33LV and BL-11 as amine catalysts, DM9794 as tin catalyst and alos included PX1594 as aa dye. The relative amounts of these components and TDI Index used in the examples are:

Examples 1C, 2, 3, 16C and 17C: 0.045 parts 33LV, 0.03 parts BL-11, 0.5 parts DM9793, 3.15 parts PX1594, and a TDI index of 110 for Examples 1C, 16C, and 17C; 100 for Example 2; and 90 for Example 3.

Examples 4 and 5C: 0.044 parts 33LV, 0.05 parts BL-11, 0.5 parts DM9793, 3.0 parts PX1594, and a TDI index of 116.

Examples 6C and 7: 0.096 parts 33LV, 0.064 parts BL-11, 0.6 parts DM9793, 4.0 parts PX1594, and a TDI index of 106.

Examples 8 and 9: 0.05 parts 33LV, 0.032 parts BL-11, 0.49 parts DM9793, 3.15 parts PX1594, and a TDI index of 107.

Examples 10, 11 and 12C: 0.07 parts 33LV, 0.044 parts BL-11, 0.44 parts DM9793, 42.57 parts PX1594, and a TDI index of 105.

Examples 13C, 14 and 15: 0.07 parts 33LV, 0.046 parts BL-11, 0.65 parts DM9793, 4.0 parts PX1594, and a TDI index of 101.

TABLE 1

Effects of Surfactant, Surfactant Concentration and Polyol Composition

| EXAMPLE | Graft Polyol | Conventional Polyol | Surfactant B8870 | Surfactant L620 | TDI Index | Density lb./ft.$^3$ | Air Flow | GM Water Impermeability Test * |
|---|---|---|---|---|---|---|---|---|
| 1C | 80 | 20 | 0 | 1 | 110 | 2.16 | 0.04 | 2 Min. |
| 2 | 80 | 20 | 1 | 0 | 100 | 2.23 | 0.1 | >24 Hrs. |
| 3 | 80 | 20 | 1 | 0 | 90 | 2.48 | 0.05 | >24 Hrs. |
| 4 | 80 | 20 | 1 | 0 | 116 | 1.73 | 0.04 | >6 Days |
| 5C | 80 | 20 | 0 | 1 | 116 | 1.77 | 2.33 | 15 Sec. |
| 6C | 80 | 20 | 0.7 | 0 | 106 | 1.56 | 0.09 | 18 Min. |
| 7 | 80 | 20 | 1.4 | 0 | 106 | 1.52 | 1.28 | 69 Min. |
| 8 | 80 | 20 | 0.6 | 0 | 107 | 1.66 | 0.17 | >24 Hr. |

TABLE 1-continued

Effects of Surfactant, Surfactant Concentration and Polyol Composition

| EXAMPLE | Graft Polyol | Conventional Polyol | Surfactant B8870 | L620 | TDI Index | Density lb./ft.$^3$ | Air Flow | GM Water Impermeability Test * |
|---|---|---|---|---|---|---|---|---|
| 9 | 80 | 20 | 1.2 | 0 | 107 | 1.7 | 0.07 | >24 Hr. |
| 10 | 80 | 20 | 0.7 | 0 | 105 | 2.96 | 0 | >24 Hr. |
| 11 | 80 | 20 | 1.4 | 0 | 105 | 2.91 | 0.05 | >24 Hr. |
| 12C | 80 | 20 | 0 | 0.7 | 105 | 2.99 | 1.37 | 7 Sec. |
| 13C | 75 | 25 | 0 | 0.65 | 101 | 1.35 | 1.5 | 11 Sec. |
| 14 | 75 | 25 | 0.65 | 0 | 101 | 1.43 | 0.07 | >24 Hr. |
| 15 | 75 | 25 | 1.3 | 0 | 101 | 1.41 | 0.08 | >24 Hr. |
| 16C | 60 | 40 | 1 | 0 | 110 | 2.25 | 0.06 | >1 Hr. |
| 17C | 40 | 60 | 1 | 0 | 110 | 2.12 | 0.3 | >1 Hr. |

*Time from addition of water until leakage is observed
Conventional Polyol-M7059
Graft Polyol-P1442 (30% Polystyrene/10% polyacrylonitrile on conventional EO/PO Backbone
L620-Silicone surfactant for flexible polyether polyurethane foam
B8870-Silicone surfactant for Semi-rigid polyurethane foams
Additional Components include: 33-LV; BL-11 (Tertiary Amine catalysts); DM9793 (Stannous Octoate catalyst, 1:2 Tin Octoate:Mineral Oil;
PBR-Pentabromodiphenyl oxide (85% with 15% phosphate plasticizer)-fire retardant As can be seen from Table 1, the use of a surfactant such as L620 from OSi; which is typically recommended for the manufacture of conventional flexible polyether polyol based polyurethane foams, gives water impermeability test results indicating poor hydrophobicity. When the same ratio of graft polyol to conventional polyol is utilized in the presence of about one part of a hydrophobicity inducing surfactant, such as Goldschmidt's B8870, exceptional water impermeability results (i.e., no penetration in 24 hours).

A preferred composition for a hydrophobic polyurethane foam according to the present invention comprises about 80 parts graft polyol and about 20 parts conventional PO/EO polyether polyol. The TDI index is adjusted to about 100 (Example 2). A lower TDI index results in higher density, softer foam, but the hydrophobicity of the resultant foam remains very high (Example 3). The TDI index may range from about 75 to about 125. (See, for example, Examples 3–4.) A suitable surfactant is added in an amount of about 1 part based on 100 parts polyol. Lower amounts of surfactant may result in a lower hydrophobicity. Useful surfactant concentrations vary depending on composition, TDI index, catalyst concentration, etc., but proper adjustment of surfactant concentration and type, in light of the present invention, is well known to persons of ordinary skill in the art. (See Examples 6C-11).

Table 2 shows the results of testing a wide range of surfactants for use in the present invention. The foams of Table 2 were all prepared utilizing 80 parts P1442 graft polyol from BASF and 20 parts M7059 conventional polyol from Bayer. The TDI index was adjusted to 110 for all of the foams of Table 2. In addition, the foams of Table 2 contain 1 part surfactant and utilize, as the catalyst system, 0.045 parts 33-LV and 0.03 parts BL-11 as the amine component and 0.54 parts, DM9793 as the tin component. As shown in Table 2, a wide range of surfactants may be used to prepare foams according to the present invention. In addition, the foams have a wide range of densities, air flow, and CFD. Identification of the proper surfactants is conducted without regard to the manufacturers' specification, and thus the physical properties of the foam resulting from surfactants tested in Table 2 would be expected to vary widely.

TABLE 2

Effect of Surfactants

| Example # | Surfactant | Density | Air Flow | CFD | GM-test | Comments |
|---|---|---|---|---|---|---|
| 18C | DC5188 | 1.81 | 0.14 | 25 = 1.40<br>50 = 1.53<br>70 = 3.00 | 10 Sec. | |
| 19C | DC5980 | 1.91 | 3 | 25 = 1.21<br>50 = 1.31<br>70 = 2.66 | 10 Sec. | |
| 20 | DC5604 | 1.85 | 0.02 | 25 = 1.41<br>50 = 1.64<br>70 = 2.95 | >24 Hr. | |
| 21 | DC5598 | 1.95 | 0.02 | 25 = 1.58<br>50 = 1.94<br>70 = 3.40 | >24 Hr. | |
| 22C | DC5941 | 1.9 | 2 | 25 = 1.19<br>50 = 1.30<br>70 = 2.59 | 10 Sec. | |

TABLE 2-continued

Effect of Surfactants

| Example # | Surfactant | Density | Air Flow | CFD | GM-test | Comments |
|---|---|---|---|---|---|---|
| 23C | DC5357 | 2.07 | | 25 = 1.51<br>50 = 1.63<br>70 = 3.12 | | Foam Boiled |
| 24 | B8870 | 2.07 | 0.2 | 25 = 0.98<br>50 = 1.10<br>70 = 2.16 | >24 Hr. | |
| 25C | B4900 | 2.07 | 3 | 25 = 0.98<br>50 = 1.05<br>70 = 2.14 | 1 Min. | |
| 26 | B8110 | 2.06 | 2.83 | 25 = 0.99<br>50 = 1.1<br>70 = 2.26 | >24Hr. | |
| 27 | B8229 | 2.1 | 1.65 | 25 = 0.98<br>50 = 1.10<br>70 = 2.16 | 1 Hr. | |
| 28 | B8232 | 2.11 | 4.5 | 25 = 0.99<br>50 = 1.14<br>70 = 2.23 | 140 Min. | |
| 29 | B8240 | 2 | 2.17 | 25 = 1.32<br>50 = 1.43<br>70 = 2.64 | >24 Hr. | |
| 30 | B8418 | 1.93 | 0.04 | 25 = 1.29<br>50 = 1.45<br>70 = 2.79 | >24 Hr. | |
| 31C | B8443 | 2.01 | 0.5 | 25 = 1.35<br>50 = 1.55<br>70 = 2.98 | 20 Sec. | |
| 32 | B8462 | 1.96 | 0.05 | 25 = 1.48<br>50 = 1.83<br>70 = 3.37 | >24 Hr. | Very coarse firm and tight |
| 33C | L530 | 1.98 | 0.23 | 25 = 1.51<br>50 = 1.63<br>70 = 3.12 | 20 Min. | |
| 34C | L631 | 2.01 | 0.53 | 25 = 1.84<br>50 = 1.40<br>70 = 2.73 | 12 Sec. | |
| 35C | L5770 | 1.96 | 0.55 | 25 = 1.52<br>50 = 1.61<br>70 = 2.97 | 1 Min. | |
| 36 | L600 | 1.93 | 0.32 | 25 = 1.45<br>50 = 1.51<br>70 = 2.95 | 1 Hr. | |
| 37 | L626 | 2 | 0.13 | 25 = 1.57<br>50 = 1.70<br>70 = 3.13 | >24 Hr. | |
| 38C | L5420 | | | | | Foam Boiled |
| 39C | L6912 | | | | | Foam Boiled |
| 40 | L6164 | 2.05 | 0.37 | 25 = 1.66<br>59 = 1.75<br>70 = 3.45 | >24 Hr. | |
| 41C | Y10762 | | | | | Foam Boiled |
| 42C | L6900 | | | | | Foam Boiled |

All Samples in Table 2 use:
80 Parts P1442-Graft Polyol
20 Parts M7059-Conventional Polyol
TDI index = 110
0.045 Parts 33LV and 0.03 Parts BL11 as the amine catalyst components
0.54 DM9793 as the tin catalyst component
1 Part surfactant Having identified a wide range of surfactants that may be used to prepare foams according to the present invention, a study was undertaken to determine the range and variety of graft polyol constituent that may be used in foams according to the invention. Table 3 presents the results of the study. All of the foams in Table 4 were prepared at a TDI index of 110 and a catalyst system composed of 0.045 parts 33-LV and 0.03 parts of BL-11 as the amine constituent and about 0.5 parts of DM9793 as the tin constituent, except example 46, which used 0.20 part DM9793 to reduce shrinkage. In addition, all of the foams outlined in Table 3 contain 3.15 parts of a dye (PX1594).

As shown in Examples 43 and 44 of Table 3, the present invention works with different graft polyols. Some graft polyols, for example BASF's P1489 (Example 45C) resulted in foams which generated a shrinkage that made the measurement of physical properties impossible. However, Example 46 uses the same polyol composition as Example 45C but decreases the amount of tin catalyst to minimize shrinkage. Thus, as shown by Example 46, persons skilled in the art using the present invention may vary components in known ways to produce suitable properties for particular water impermeable foams. Examples 47–49 of Table 3 give results with 60 parts graft polyol utilizing either Goldschmidt's B8870 or B8418 as the surfactant. Examples 50 and 51 of Table 4 show the results using even lower percentages of graft polyol, 40 and 20 parts respectively. Finally, Example 52 of Table 3 shows the results of water impermeability tests when the graft polyol is omitted completely from the foam composition. As shown in Example 52, while such foams are hydrophobic in that they exhibit water impermeability for up to 10 hours, they are inferior to the hydrophobic foams of the present invention which possess other desirable physical properties (e.g. air flow) and are more readily processable.

TABLE 3

EFFECT OF GRAFT POLYOL CONCENTRATION

| Example | Graft Polyol | Parts Graft Polyol | Surfactant | Parts Surfactant | Density | Air Flow | GM-Test |
|---|---|---|---|---|---|---|---|
| 43 | P1442 | 80 | B8870 | 1 | 1.88 | 0.02 | >24 Hr. |
| 44 | H5100 | 80 | B8870 | 1 | 2.01 | 0.05 | >24 Hr. |
| 45C | P1489 | 80 | B8870 | 1 | 1.88 | — | — |
| 46 | P1489 | 80 | B8870 | 1 | 1.98 | 0.17 | >24 Hr. |
| 47 | P1442 | 60 | B8870 | 1 | 1.9 | 0.06 | >24 Hr. |
| 48 | P1442 | 60 | B8870 | 2 | 1.92 | 0.07 | >24 Hr. |
| 49 | P1442 | 60 | B8418 | 1 | 1.9 | 0.02 | >24 Hr. |
| 50 | P1442 | 40 | B8418 | 1 | 1.99 | 0.02 | — |
| 51 | P1442 | 20 | B8418 | 1 | 2.05 | 0.10 | >24 Hr. |
| 52 | — | 0 | B8418 | 1 | 2.1 | 0.04 | 10 Hr. |

Table 4 shows the effect of varying catalyst concentrations in order to lower air flow in a particular foam formulation. The foams of Table 4 include a surfactant used in forming conventional foams from polyether polyols. As shown in Table 4, lowering air flow by changing the catalyst concentration does not, without use of a hydrophobicity inducing surfactant, impart hydrophobicity.

TABLE 4

Effect of Catalyst Concentration
(1 part L620 surfactant)

| Example | Parts DM9793 | Density | Air Flow | GM-Test |
|---|---|---|---|---|
| 53 | 1 | 1.84 | 0.43 | 15 Sec. |
| 54 | 1.5 | 1.77 | 0.4 | 20 Sec. |
| 55 | 1.75 | 1.7 | 0.05 | 50 Sec. |
| 56 | 2 | 1.62 | 0.03 | 140 Sec. |

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

What is claimed is:

1. A polyether polyol based urethane foam composition comprising:

(a) a polyurethane having polyol segments consisting essentially of polyol segments derived from a graft polyol and polyol segments derived from a PO/EO polyether polyol; and (b) a hydrophobicity inducing surfactant, the foam composition being sufficiently hydrophobic to hold a head of water of about 25 mm for at least about 90 minutes when at least about 50% compressed, with no leaks through the foam.

2. The composition of claim 1, wherein the surfactant is selected from the group consisting of B8110, B8232, B8240, B8870, B8418 and B8462 from Goldschmidt Chemical Corp; L626 and L6164 from OSi; and DC5604 and DC5598 from Air Products and Chemicals, Inc.

3. The composition of claim 1, wherein the surfactant is selected from the group consisting of B8870, B8110, B8240, B8418 and B8462 from Goldschmidt Chemical Corp.; L626 and L6164 from OSi; and DC5604 and DC5568 from Air Products and Chemicals, Inc.

4. The composition of claim 1, wherein the hydrophobicity inducing surfactant is B8418.

5. The composition of claim 1, wherein the surfactant is a polysiloxane-polyalkylene oxide copolymer.

6. The composition of claim 1, wherein the polysiloxane-polyalkylene oxide copolymer is non-hydrolyzable.

7. The composition of claim 1, wherein the surfactant is suitable for forming rigid foams.

8. The composition of claim 1, wherein the surfactant is suitable for forming flexible foams.

9. The composition of claim 1, wherein the surfactant is suitable for forming semi-rigid foams.

10. The composition of claim 1, wherein the graft polyol comprises a graft polymer of a poly(ethylene oxide/propylene oxide) polyether polyol, polystyrene and polyacrylonitrile.

11. The composition of claim 1, wherein the polyurethane further comprises urethane segments derived from a polyisocyanate.

12. The composition of claim 1, wherein the foam is sufficiently hydrophobic to pass an automotive water impermeability test selected from the Ford Laboratory test method entitled "Test to Verify Water Impermeability of Urethane Foam Seals" and the General Motors water impermeability test for flexible expanded rubber foam materials.

13. The composition of claim 1, wherein the foam is sufficiently hydrophobic to hold said head of water for at least about 24 hours.

14. The composition of claim 1, wherein at least some of the surfactant has been removed.

15. A polyether polyol based hydrophobic polyurethane foam prepared from a polyol consisting essentially of a conventional polyether polyol and a graft polyol, said foam being sufficiently hydrophobic to hold a head of water of about 25 mm for at least about 60 minutes when at least about 50% compressed, with no leaks through the foam.

16. The foam of claim 15, prepared from about 80 parts graft polyol and about 20 parts conventional polyether polyol.

17. The foam of claim 15, prepared from a surfactant selected from the group consisting of B8110, B8229, B8232, B8240, B8870, B8418 and B8462 from Goldschmidt Chemical Corp.; L626, L600 and L6164 from OSi; and DC5604 and DC5598 from Air Products and Chemicals, Inc.

18. The foam of claim 15, prepared from a surfactant selected from the group consisting of B8870, B8110, B8240, B8418 and B8462 from Goldschmidt Chemical Corp.; L626 and L6164 from OSi; and DC5604 and DC5568 from Air Products and Chemicals, Inc.

19. The foam of claim 15, wherein the surfactant is B8418.

20. The foam of claim 15, wherein the foam is sufficiently hydrophobic to hold said head of water for at least about 90 minutes.

21. The foam of claim 15, wherein the foam is sufficiently hydrophobic to hold said head of water for at least about 24 hours.

22. The foam of claim 15, wherein the foam is sufficiently hydrophobic to pass an automotive water impermeability test selected from the Ford Laboratory test method entitled "Test to Verify Water Impermeability of Urethane Foam Seals" and the General Motors water impermeability test for flexible expanded rubber foam materials.

23. The foam of claim 15, wherein the graft polyol comprises a graft polymer based on a poly(ethylene oxide/propylene oxide) polyether polyol backbone.

24. The foam of claim 23, wherein the graft polyol comprises segments derived from at least one of styrene and acrylonitrile.

25. The foam of claim 23, wherein the graft polyol comprises about 60% poly(ethylene oxide/propylene oxide) polyether polyol, about 30% styrene and about 10% acrylonitrile.

26. The foam of claim 15, further prepared from at least one of a catalyst, a dye, a blowing and a fire retardant.

27. The foam of claim 15, having an air permeability of from about 0.01 to about 5.0 $ft^3/ft^2$/min.

28. The foam of claim 15, having a density of no more that about 4.0 $lb/ft^3$.

29. A manufactured article comprising a polyether polyol based hydrophobic polyurethane foam prepared from a polyol consisting essentially of a conventional polyether polyol and a graft polyol, said foam being sufficiently hydrophobic to hold a head of water of about 25 mm for at least about 90 minutes when at least about 50% compressed, with no leaks through the foam.

30. The manufactured article of claim 29, said article being selected from cushioning, padding, a seal and a gasket.

31. A hydrophobic urethane foam produced by the process of
combining a polyisocyanate with a polyol consisting essentially of a conventional polyether polyol and a graft polyol and
allowing said polyisocyanate, said conventional polyether polyol and said graft polyol to react in the presence of a surfactant,
said foam being sufficiently hydrophobic to hold a head of water of about 25 mm for at least about 60 minutes when at least about 50% compressed, with no leaks through the foam.

32. The foam of claim 31, being sufficiently hydrophobic to hold said head of water for at least about 90 minutes.

33. The foam of claim 31, being sufficiently hydrophobic to hold said head of water for at least about 24 hours.

34. The foam of claim 31, wherein the foam is sufficiently hydrophobic to pass an automotive water impermeability test selected from the Ford Laboratory test method entitled "Test to Verify Water Impermeability of Urethane Foam Seals" and the General Motors water impermeability test for flexible expanded rubber foam materials.

35. The foam of claim 31, having a polyisocyanate index of from about 75 to about 125.

36. The foam of claim 31, wherein the polyisocyanate is toluene diisocyanate.

37. The foam of claim 36, having a TDI index of about 100.

38. A polyether polyol based hydrophobic polyurethane foam composition prepared from:
a polyol consisting essentially of a graft polyol and a conventional polyether polyol, and having at least about 20 parts of a graft polyol and not more than about 80 parts of a conventional polyether polyol;
a polyisocyanate; and
a hydrophobicity inducing surfactant;
wherein said foam is sufficiently hydrophobic to hold a head of water of about 25 mm for at least about 90 minutes when at least about 50% compressed, with no leaks through the foam.

39. The foam of claim 38, prepared from about 80 parts graft polyol and about 20 parts conventional polyether polyol.

40. The foam of claim 38, wherein the graft polyol comprises a graft polymer of styrene, acrylonitrile and a poly(ethylene oxide/propylene oxide) polyether polyol.

41. The foam of claim 40, wherein the graft polymer comprises about 60% poly(ethylene oxide/propylene oxide) polyether polyol, about 30% styrene and about 10% acrylonitrile.

42. The foam of claim 38, wherein the surfactant is selected from the group consisting of B8110, B8232, B8240, B8870, B8418 and B8462 from Goldschmidt Chemical Corp.; L626 and L6164 from OSi; and DC5604 and DC5598 from Air Products and Chemicals, Inc.

43. The foam of claim 38, wherein the surfactant is selected from the group consisting of B8870, B8110, B8240, B8418 and B8462 from Goldschmidt Chemical Corp.; L626 and L6164 from OSi; and DC5604 and DC5568 from Air Products and Chemicals, Inc.

44. The composition of claim 38, wherein the surfactant is B8418.

45. A polyether polyol based foam prepared from a polylsocyanate, a polysiloxane-polyalkylene oxide copolymer surfactant, and a polyol consisting essentially of a PO/EO polyether polyol, a graft polyol, the foam being sufficiently hydrophobic to hold a head of water of about 25 mm for at least about 60 minutes when at least about 50% compressed, with no leaks through the foam.

46. The foam of claim 45, wherein the ratio of PO/EO polyether polyol to graft polyol is about 20:80.

47. The foam of claim 45, wherein the surfactant is B8418.

48. A process for preparing a hydrophobic polyether polyol based urethane foam comprising: combining a polyol consisting essentially of a conventional polyether polyol and a graft polyol, a hydrophobicity inducing surfactant and a polyisocyanate; and
allowing said polyisocyanate and said polyol to react, the resultant foam being sufficiently hydrophobic to hold a head of water of about 25 mm for at least about 90 minutes when at least about 50% compressed, with no leaks through the foam.

49. The process of claim 48, wherein the surfactant is selected from the group consisting of B8110, B8232, B8240, B8870, B8418 and B8462 from Goldschmidt Chemical Corp.; L626 and L6164 from OSi; and DC5604 and DC5598 from Air Products and Chemicals, Inc.

50. The process of claim 48, wherein the surfactant is selected from the group consisting of B8870, B8110, B8240, B8418 and B8462 from Goldschmidt Chemical Corp.; L626 and L6164 from OSi; and DC5604 and DC5568 from Air Products and Chemicals, Inc.

51. The process of claim 48, wherein the hydrophobicity inducing surfactant is B8418.

52. The process of claim 48, wherein the ratio of graft polyol to conventional polyether polyol is at least 20:80.

53. The process of claim 48, wherein the ratio of graft polyol to conventional polyether polyol is up to about 80:20.

54. The process of claim 48, wherein the polyisocyanate is toluene diisocyanate.

55. A method for selecting the components of a polyether polyol hydrophobic foam comprising:
(a) combining a known amount of at least one surfactant and an amount of a polyol consisting essentially of an amount of at least one graft polyol, and an amount of at least one conventional polyether polyol,
(b) preparing a first polyurethane foam from said at least one graft polyol, said at least one conventional polyol and said at least one surfactant,
(c) testing the first foam for hydrophobicity when at least about 50% compressed,
(d) selecting the first foam if it is sufficiently hydrophobic to hold a head of water of about 25 mm for at least about 90 minutes with no leaks through the foam, and
(e) not selecting the first foam if it is not sufficiently hydrophobic to hold a head of water of about 25 mm for at least about 90 minutes with no leaks through the foam.

56. The method of claim 55, comprising:
(a) preparing a second polyurethane foam varying the identity and/or amount of at least one of said at least one graft polyol, said at least one conventional polyether polyol or said at least one surfactant,
(b) testing the second foam for hydrophobicity when to at least about 50% compressed, and
(c) selecting the second foam if it is sufficiently hydrophobic to hold a head of water of about 25 mm for at least about 90 minutes with no leaks through the foam.

57. The foam of claim 15, wherein the conventional polyether polyol is a copolymer consisting of ethylene oxide and propylene oxide.

58. The foam of claim 57, wherein the copolymer consisting of ethylene oxide and propylene oxide is selected from block copolymers, random copolymers and combinations thereof.

59. The foam of claim 15, wherein the conventional polyether polyol is selected from M7059, 3222 and 1388.

60. A hydrophobic polyether polyol based polyurethane foam prepared from:
(a) a polyol consisting essentially of a graft polyol, and a copolymer of ethylene oxide and propylene oxide, and
(b) a hydrophobicity inducing surfactant;
wherein the foam is sufficiently hydrophobic to pass an automotive water impermeability test selected from the Ford Laboratory test method entitled "Test to Verify Water Impermeability of Urethane Foam Seals" and the General Motors water impermeability test for flexible expanded rubber foam materials.

61. The composition of claim 1, wherein the hydrophobicity inducing surfactant is B8870.

62. The foam of claim 15, wherein the surfactant is B8870.

63. The composition of claim 38, wherein the surfactant is B8870.

64. The foam of claim 45, wherein the surfactant is B8870.

65. The process of claim 48, wherein the the hydrophobicity inducing surfactant is B8870.

* * * * *